E. GRAY.
SPEAR.
APPLICATION FILED AUG. 4, 1919.
1,337,902.
Patented Apr. 20, 1920.
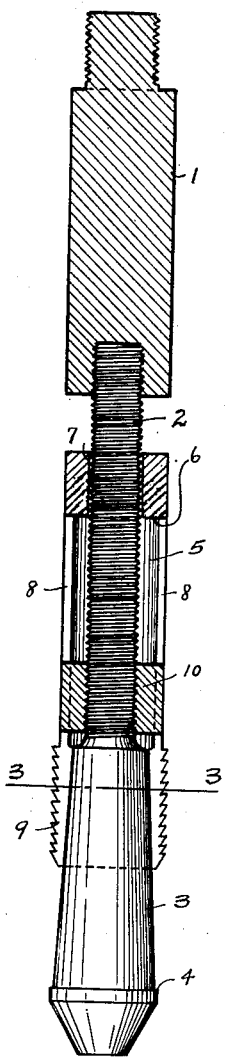
Fig. 1.
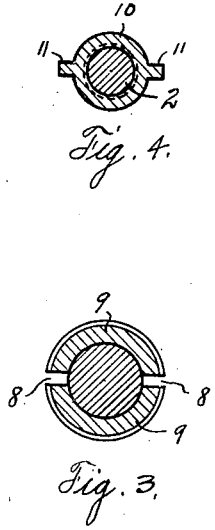
Fig. 4.
Fig. 3.
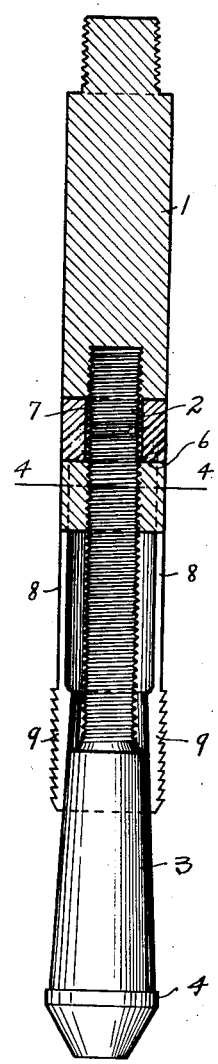
Fig. 2.
Ellsworth Gray,
Inventor,
By Hardway & Cathey
Attorneys

UNITED STATES PATENT OFFICE.

ELLSWORTH GRAY, OF GOOSE CREEK, TEXAS.

SPEAR.

1,337,902.                Specification of Letters Patent.     Patented Apr. 20, 1920.

Application filed August 4, 1919. Serial No. 315,039.

*To all whom it may concern:*

Be it known that I, ELLSWORTH GRAY, a citizen of the United States, residing at Goose Creek, in the county of Harris and State of Texas, have invented certain new and useful Improvements in Spears, of which the following is a specification.

This invention relates to new and useful improvements in a spear designed for withdrawing pipe from well bores.

One object of the invention is to provide a spear formed to engage with a pipe which may become stuck in a well bore, and through which said pipe may be withdrawn.

Another object of the invention is to provide a device of the character described which may be readily released from the pipe in case said pipe can not be pulled, or when for any other reason, it is desired to release the same from the pipe and withdraw it from the bore.

A further feature of the invention resides in the provision of a pipe pulling spear, which is simple in construction, and effective in use, and one which may be cheaply and easily manufactured.

With the above and other objects in view, the invention has particular relation to certain novel features of construction, operation and arrangement of parts, an example of which is given in this specification and illustrated in the accompanying drawings, wherein:

Figure 1 is a vertical sectional view of the device shown in position to be engaged with the pipe to be pulled.

Fig. 2, is a vertical sectional view shown in released position.

Fig. 3, is a transverse sectional view taken on the line 3—3 of Fig. 1, and

Fig. 4, is a transverse sectional view taken on the line 4—4 of Fig. 2.

Referring now more particularly to the drawings, wherein like numerals of reference designate similar parts in each of the figures, the numeral 1, refers to a coupling, the upper end of which is reduced and threaded for attachment to a string of pipe, through which the spear may be let down into the bore. The numeral 2, refers to a rod which is threaded from end to end with a right hand thread, and whose upper end is screwed into the lower end of the coupling 1. The lower end of this rod is formed into an enlarged downwardly flared mandrel, 3, whose lower end is tapered and formed with an annular shoulder 4. The numeral 5, designates an expansible tubular gripping member whose upper end is formed with the annular shoulder 6, having the central passageway 7, through which the rod 2 passes. The gripping member 5, has opposing slots 8, 8, extending from the shoulder 6 down to the lower end thereof, provided for the expansion of said member, and the lower end of the gripping member is formed with opposing grip jaws 9, 9, formed with peripheral ratchet teeth for engagement with the pipe to be pulled. Threaded on the rod 2, within the gripping member 5, there is the nut 10, having opposing lateral ribs 11, 11, which project in the corresponding slots 8, 8.

When a drill stem or pipe becomes stuck in the bore, the rod 2, is turned so as to run the nut 10 to the lower end thereof and the device is then attached to the lower end of the string of pipe and let down into the bore, the lower end of the mandrel 3 entering the upper end of the pipe to be pulled, said lower end being tapered to insure its entrance into said pipe. The string is then released and the lower end of the coupling 1, will strike against the upper end of the gripping member 5, and force the grip jaws 9 down into the pipe to be pulled. The string of tubing to which the spear is attached is then pulled upwardly, thus pulling the mandrel 3 upwardly, relative to the grip jaws 9, causing said jaws to spread and engage with the pipe to be pulled until the annular shoulder 4 contacts against the lower end of the grip jaws 9. The spear is thus engaged with the pipe to be pulled and an upward pull thereon will usually result in the withdrawal of the stuck pipe. In case said pipe is stuck so fast that it can not be pulled, the string of tubing to which the string is attached is released and drops down, carrying the mandrel downwardly relative to the jaws 9, and releasing said jaws from the pipe. The string of tubing is then rotated in a right hand direction, which will result in the elevation of the nut 10, on the rod 2, as shown in Fig. 2. This will operate to hold the mandrel 3 projected from the jaws 9, as illustrated in Fig. 2, and prevent it from spreading said jaws when the spear is again pulled upwardly. An upward pull on the string of tubing to which the spear is attached will then result in the withdrawal of the spear from the bore.

What I claim is:

1. A spear for withdrawing pipe including a tapering mandrel provided for attachment to the lower end of a string of tubing, and formed with an outwardly threaded rod, an expansible pipe engaging member fitted over said mandrel and adapted to enter the pipe to be pulled and formed with grip jaws, said mandrel wedging between said jaws to expand the same into engagement with the pipe, when the mandrel is moved upwardly relative to the jaws, and a nut threaded on to the rod and movable by the rotation thereof into position to lock said mandrel and member against movement relative to each other.

2. A spear for withdrawing pipe including a mandrel provided for attachment to the lower end of a string of tubing, and formed with an outwardly threaded section, an expansible pipe engaging member fitted over said mandrel and adapted to enter the pipe to be pulled and formed with grip jaws which may be expanded by said mandrel wedging between the same, a nut threaded on to said section and in engagement with said member, whereby said nut is held against turning when the mandrel is turned, said nut being adapted to move on said section when the latter is turned to lock the mandrel and pipe engaging member against relative movement.

In testimony whereof I have signed my name to this specification in the presence of two subscribing witnesses.

ELLSWORTH GRAY.

Witnesses:
W. FLOWERS,
E. W. ABBOTT.